United States Patent [19]

Gregory

[11] Patent Number: 5,785,279
[45] Date of Patent: Jul. 28, 1998

[54] SATELLITE EXCLUSION ZONE VIEWING AND CONTROL SYSTEM

[75] Inventor: Donald D. Gregory, Fort Wayne, Ind.

[73] Assignee: ITT Defense, Inc., McLean, Va.

[21] Appl. No.: 587,733

[22] Filed: Jan. 19, 1996

[51] Int. Cl.$^6$ ............................................. B64G 1/00
[52] U.S. Cl. ........................................... 244/158 R
[58] Field of Search .......................... 244/158 R, 164; 455/12.1, 13.1, 13.3; 342/352–358; 89/1.11; 250/203.1, 203.3, 203.6

[56] References Cited

U.S. PATENT DOCUMENTS

| | | | |
|---|---|---|---|
| 3,995,801 | 12/1976 | Bond | 244/158 R |
| 4,502,051 | 2/1985 | Dondl | 244/158 R |
| 5,415,368 | 5/1995 | Horstein | 244/158 R |

*Primary Examiner*—Galen L. Barefoot
*Attorney, Agent, or Firm*—Plevy & Associates

[57] ABSTRACT

The present invention concerns a system and method for controlling which regions of the earth are image sensed by a satellite imaging system having location determination processing and command and control for pointing a satellite to a specific location about the earth for imaging. The invention utilizes exclusion zones, which define the regions of the earth restricted from image sensing. The exclusion zones are either defined by hard wired logic circuitry, or stored onto read only memory in association with a processor, or stored onto random access memory in association with a processor. The stored exclusion zones are tied to the satellite imaging systems location determination processing system and command and control system. The random access memory is set with the exclusion zone regions of the earth by encrypted signals transmitted from a ground station. Ground commands transmitting imaging coordinates conflicting with the exclusion zone locations result in either the satellite being rolled or a mirror being rotated to a non-imaging position, or not turning on the data flow at the focal plane of the image sensor. The present invention also provides for a control of the satellite imaging system, as to sensing any region of the earth, by encrypted signals transmitted from a ground station for either rolling the satellite or rotating the mirror on the satellite to a non-imaging position, or not turning on the data flow at the focal plane of the image sensor.

26 Claims, 3 Drawing Sheets

SATELLITE EXCLUSION ZONE VIEWING AND CONTROL SYSTEM

FIELD OF THE INVENTION

The present invention concerns a system and method for controlling which part of the earth can be viewed by a satellite imaging system through the use of exclusion zones defining portions of the earth restricted from viewing and a control system for effecting such restricted viewing.

BACKGROUND OF THE INVENTION

A satellite imaging system consists of instruments with supporting hardware and software for obtaining remote images of the earth and objects in space. The types of images obtained may be optical, microwave or obtained by using some other part of the electromagnetic spectrum. In order to image at a known location, a location sensor system must know where to look, and then look there. The satellite carrying the image sensor determines its location from a variety of ways, depending upon the specific satellite. The satellite can have a star sensor, sun sensor, earth horizon sensor, magnetic sensor, Global Positioning System (GPS) receivers, internal gyroscopics, or some combination of them all.

A method for determining satellite positions and locations above and about the earth is illustrated by the Global Positioning system. The GPS is an accurate, three-dimensional navigation system. GPS consists of a constellation of twenty one satellites and three spares that orbit the earth twice a day at an attitude of 10,898 miles, transmitting precise timing information. A network of ground stations and passive user receivers respond to the information. Each satellite continuously broadcasts pseudo-random codes at L-band frequencies, L1 at 1575.42 MHz and L2 at 1227.6 MHZ. L1 is modulated with two types of code, the coarse/acquisition code (CA-code) and precision code (P-code). L2 carries an encrypted P-code. The network of ground stations are at precisely known locations. Transmissions are received from satellites, analyzed and GPS time is compared with universal standard time at the ground stations. Corrections are transmitted to the satellites from the ground stations. To determine a location (latitude, longitude and altitude) a user requires the simultaneous signals from four or more satellites orbiting the earth. Simultaneous signals from at least three satellites can be used to provide two dimensional positioning (latitude and longitude. The signals are analyzed and interpreted by the GPS receiver to determine the location. The interval between the transmission and the reception of the satellite signal is used to calculate the unit's distance from each of the satellites being used. Those distances are used in algorithms to compute a position.

Currently, the United States government does not allow the sale of remote sensing (imaging) systems that view the earth, with a resolution in the less than one (1) to five (5) meter size, to foreign governments, unless the satellite control ground station and the image collecting ground station both reside within and under control of the United States. This policy allows the United States (US) government to control the images a foreign government can have and allows the US government to vary the permitted viewing areas as the changing foreign policy dictates. Such a policy of requiring both the control ground stations and imaging ground stations to reside within the United States or under United States control, limits the marketability of remote imaging systems since currently two foreign governments permit the sale of such systems without any restrictions.

Accordingly, it is an object of the present invention to provide a system and method for preventing satellite imaging systems from viewing prohibited regions of the earth.

SUMMARY OF THE INVENTION

The present invention concerns a satellite imaging system with sensing means including location determination processing means and command and control means for pointing the satellite imaging system to any region of the earth for imaging. The present invention provides storage means for data indicative of exclusion zones defining regions of the earth restricted from imaging by the satellite imaging system. The exclusion zone defined regions of the earth are implemented with logic circuitry hard wired to the sensing means having location determination processing means and the command and control means. Alternatively, the exclusion zone is implemented with a processor using read only memory (ROM), containing the data indicative of the exclusion zone defined region of the earth, coupled to the sensing means. Still alternatively, the exclusion zone is implemented with a processor using random access memory (RAM), containing the data indicative of the exclusion zone defined region of the earth. The random access memory can be stored or changed with the exclusion zone defined region of the earth by encrypted signals transmitted by a ground control station or by another orbiting satellite.

When ground commands transmit imaging coordinates which include the exclusion zone defined region of the earth, the sensing means with its location determination processing and command and control of the satellite imaging system to operate in a first mode to either roll the satellite or rotate the mirror on a satellite to an non-imaging position, and not turn on the data flow at the focal plane of the image sensor.

The control means of the satellite imaging system when activated by a transmitted encrypted signal causes the sensing means with the location determination processing means and command and control means of the satellite imaging system to operate in a second mode to either roll the satellite or rotate the mirror on a satellite to an non-imaging position, and not turn on the data flow at the focal plane of the image sensor. Operation of the sensing means in the second mode is independent from operation in the first mode.

A method for preventing the imaging of restricted areas of the earth by a satellite imaging system with sensing means having location determination processing and command and control for image sensing locations about the earth is disclosed by the present invention. Initially an exclusion zone is formed defining a region of the earth restricted from imaging. The exclusion zone defined region is stored on board the satellite imaging system. Imaging coordinates are transmitted to the satellite imaging system by a ground control station. A determination is made if the imaging coordinates include the exclusion zone defined region of the earth. If the imaging coordinates do include the exclusion zone defined region of the earth, then imaging of the ground transmitted coordinates is prevented by the sensing means. However, if the imaging coordinates do not include the exclusion zone defined region of the earth, then imaging of the ground coordinates is permitted by the sensing means. As a fail safe mechanism, the present invention also discloses controlling the satellite imaging system as to image sensing any region of the earth by encrypted signals transmitted from a ground control-station.

The present invention provides the capability of preventing image sensing of regions of the earth restricted by the United States government, while allowing the ground control and image collecting stations to be outside United States territory or control. Such a mechanism for preventing imaging of restricted areas provides increased marketability when currently two governments allow sale of such imaging systems without the territorial or control restrictions imposed by the United States government.

DETAILED DESCRIPTION OF THE INVENTION

Figure 1:
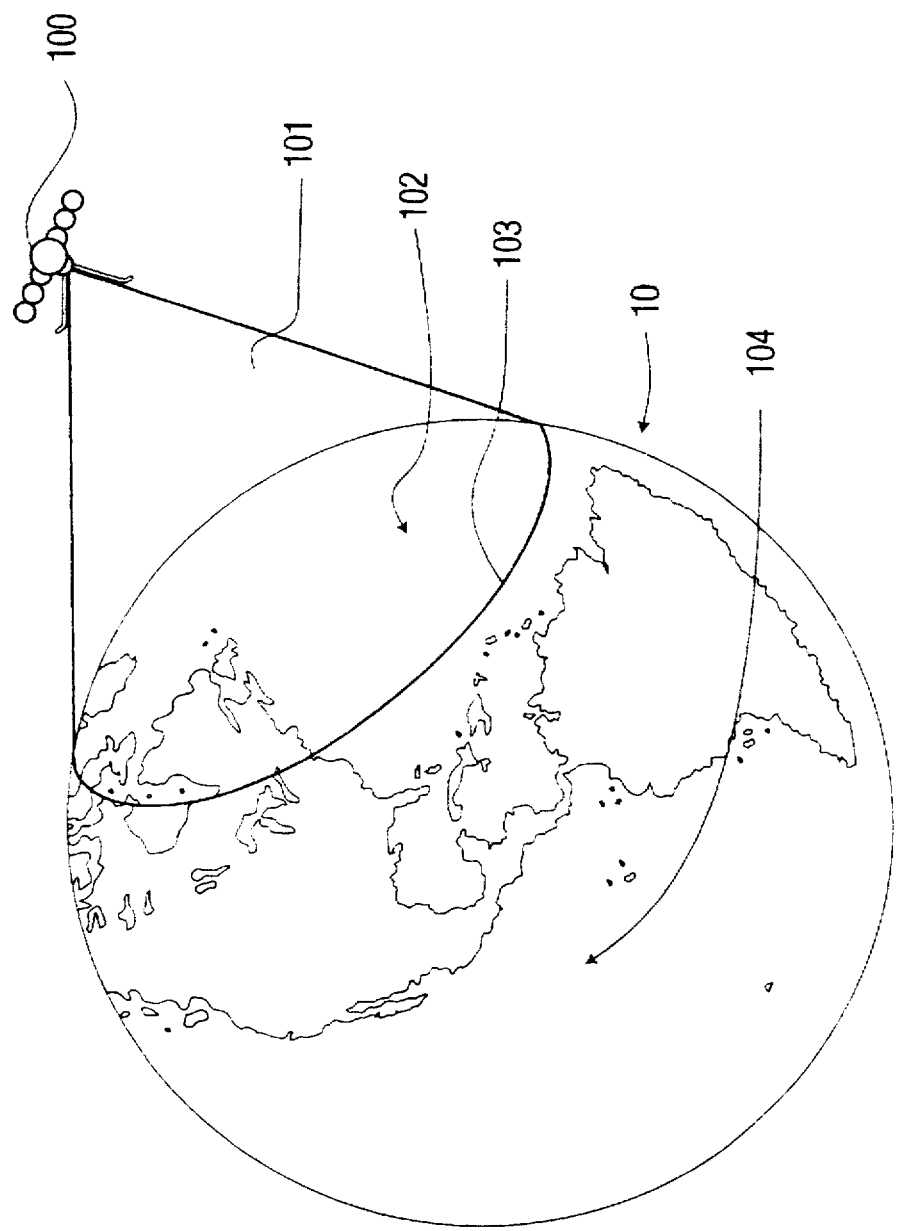
FIG. 1 shows a detail of a single satellite's area of coverage.

Although the present invention can be used in any and all space orbiting remote sensing systems, the present invention is especially suited for use in any communication system with pointing requirements, any active system such as RADAR, LIDAR (light detection and ranging) and LADAR (laser detection and ranging), and to any system with sensitivities to specific locations above or about the earth as to whether or not they could function over given parts of the earth for whatever reason. Accordingly the present invention will be described in conjunction with a satellite imaging system with sensing instruments (means) including location determination processing hardware/software (means) and command and control hardware/software (means) for pointing the satellites and image sensors towards any region of the earth for image sensing.

For the present invention a satellite's downlink radio signal can also be used to determine its altitude. The information from the sensors is processed, either on the ground or on board the satellite, to determine the satellite's location. The imaging sensor is mounted to the satellite in a known configuration, so that the location and orientation of the imaging sensor is known. The imaging system is then commanded to look at the desired location. The "act of looking" (pointing) is accomplished by moving a mirror, moving the sensor's telescope, or by moving the satellite itself. The image is then taken and the data is transmitted in the radio frequency range to an image collecting ground station through the satellite's downlink.

The present invention prevents a satellite imaging system from viewing regions of the earth that United States policy prohibits, or any other country for that matter, through the use exclusion zone defined regions of the earth, while at the same time allowing a foreign customer to own and operate his own system in his own country for his own purposes. The foreign owned system would be operated outside the restricted regions of the earth defined by the exclusion zone. The exclusion zone is implemented in conjunction with the location determination processing instruments (means), and command and control instruments (means) of the pointing requirements for the satellite and image sensors on board the spacecraft (satellite). To assure that the exclusion zone cannot be altered, the use of a logic circuit defining the exclusion zone restrictions is hard wired into the satellite's location determination processing instruments or command and control instruments for pointing the satellites and image sensors. Alternatively, with a processor implemented system the exclusion zone restrictions are defined by data stored in read only memory (ROM) on board the satellite. Alternatively, with a processor implemented system the exclusion zone restrictions may be defined by data stored in random access memory (RAM) initialized or changed by encrypted signals transmitted from a ground station.

With the present invention, during the course of normal satellite imaging system operation, the satellite's location sensors feed their data directly into the location determination processing system which determines the location and altitude of the satellite. The customer transmits from the ground, imaging coordinates of the region of the earth to be imaged. The location determination processing system or the command and control instruments check to see if the imaging coordinates include the exclusion zone. If not, the command and control system points the appropriate satellites and image sensors and the data flow at the focal plane of the image sensors are turned on so that imaging can occur. If the imaging coordinates do include the exclusion zone defined region of the earth, the command and control means in conjunction with the location determination processing means rolls the satellite to a non-imaging position, or if a pointing mirror is used rotates it to a non-imaging position, and does not turn on the data flow at the focal plane of the image sensor either at the preamplifiers or the analog-to-digital converter. The logic or control means of the present invention operative in the above first mode, causing the sensing means to prevent imaging of ground coordinates within the exclusion zone defined region, is either in the form of a microprocessor, a small computer, or software routines residing in the satellite system's ROM.

Exclusion zone defined regions of the earth are stored in RAM and can be updated by encrypted signals transmitted from a ground station in the United States or by another orbiting satellite, or stored in ROM on board the satellite, or defined by logic circuitry hard wired on board the satellite available to the existing location determination processing system and command and control system. Depending on United States policy, the exclusion zone defined restrictions can be implemented with the capability to change the exclusion zone as United States policy changes. To prevent the foreign customer from tampering with the exclusion zone restrictions, the satellite imaging system is turned over to the foreign customer only after the satellite is in orbit.

The logic or control means operative in the first mode, causing the sensing means to prevent imaging of an exclusion zone defined region of the earth, also operates in a second mode, independent of the first operative mode, to prevent image sensing of any region of the earth, without permission of the foreign government or customer. The control means operative in the second mode includes a "back door" that allows an encrypted signal to shut the imaging capabilities down and go into a mode similar to when an exclusion zone is encountered, i.e. roll the satellite and rotate the mirror to a non-imaging position and not turn on the data flow at the focal plane. The encrypted signal can be transmitted by a government ground station or other suitable transmission source on the ground or space above the earth.

Referring now to FIG. 1 there is shown a satellite 100 in orbit above the earth 10. The satellite 100 transmits a directional or an imaging signal 101 towards the earth 10. The directional or imaging signal can only be received or directed to an access region 102. The area 104 outside the access region 102 cannot receive a directional signal or be captured by an imaging signal 101. The edge or periphery of the access region 102 defines an arc shaped boundary 103. The access region for a directional signal may or may not be the same as the access region for the imaging signal. The exact shape and size of the access region 102 is dependent upon the position, orientation, and transmitter antenna configuration and imaging system of the satellite. These factors are well known.

Figure 1A:
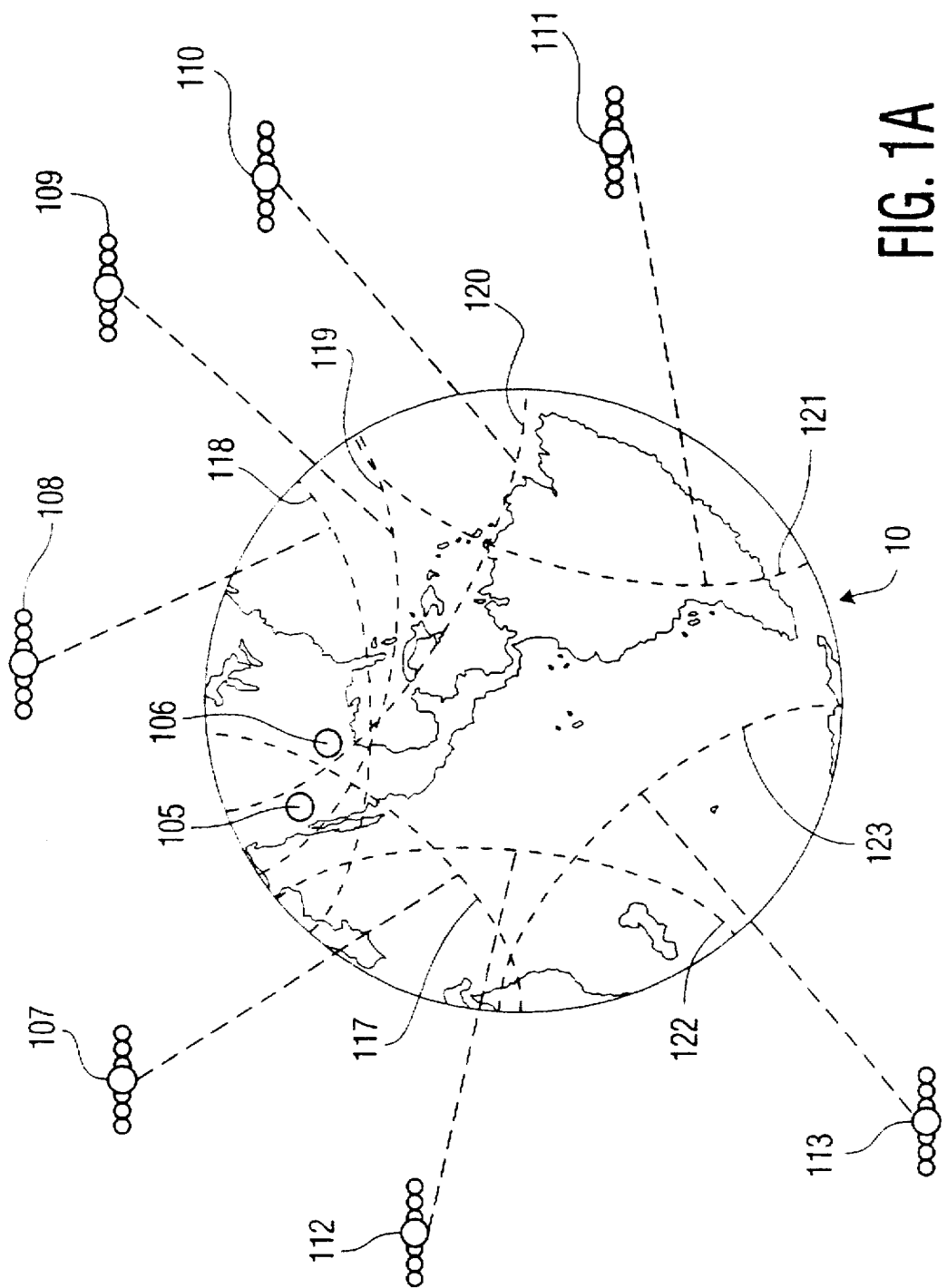
FIG. 1A shows a partial GPS satellite network and exclusion zones.

Referring to FIG. 1A, there is shown seven satellites 107, 108, 109, 110, 111, 112, 113 which are part of a satellite constellation such as the GPS, with their respective image sensing boundaries 117, 118, 119, 120, 121, 122 and 123. For purposes of illustration, the directional visibility boundaries of the above satellites coincides with the image sensing boundaries. The satellites are shown in orbit above the earth 10. Exclusion zones which are prohibited from being viewed are indicated by boundaries 105 and 106. Exclusion zone 105 is within the image sensing boundaries of satellites 107, 108 and 109. Exclusion zone 106 is within the image sensing boundaries of satellites 108, 109 and 110. For the present invention, imaging coordinates received from ground control stations which include either exclusion zone 105 or 106 result in disablement of imaging sensing capabilities for satellites whose visibility boundaries encompass the exclusion zone defined regions.

Figure 2:
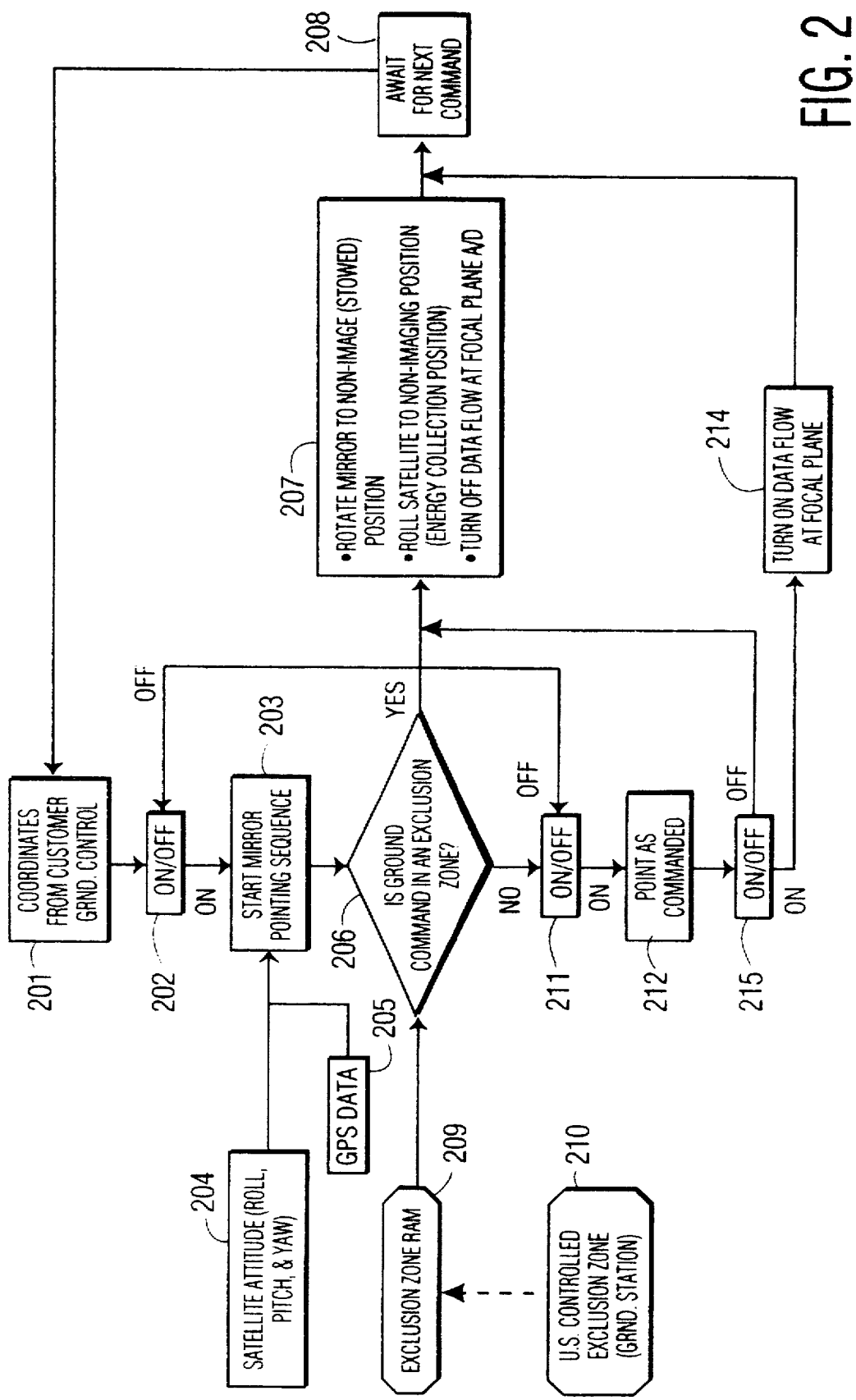
FIG. 2 is a chart illustrating the logic flow for implementing the exclusion zone and associated on/off capability for a satellite imaging system.

Referring now to FIG. 2 there is shown a flow chart illustrating the logic flow for implementing the exclusion zone restrictions and associated on/off control capability for a satellite imaging system. Each of the flow elements 201–213 represents standard, state of the art hardware which can be implemented in several different ways.

The imaging sensor aboard the satellite is commanded from the ground to look at a specific region or regions. The coordinates specifying the region for imaging is transmitted from the customer's ground control station or another orbiting satellite to the control means operative in the first mode aboard the satellite 201. If the "on/off" control means operative in the second mode is on to permit imaging 202 of any region of the earth, then the control means operative in the first mode permits the satellite's position and altitude (roll, pitch and yaw) 204 to be computed by the on board location determination processing means using data from its location sensors which may be GPS data 205, star sensor data, etc. Determination of the satellite's position and altitude begins the mirror pointing sequence 203. The ground control command is examined by the control means operative in the first mode to see if the imaging coordinates provided include an exclusion zone defined region of the earth 206. The exclusion zone defined region may be stored in the satellite system's ROM, or maintained in the system's RAM 209 and set by a radio transmitted code (encrypted signal) from a United states controlled ground station 210. If the imaging coordinates do not include an exclusion zone defined region of the earth and the on/off or control means operative in the second mode is on 211, the control means operative in the first mode causes the satellite and image sensor to be pointed as commanded, by the on board command and control system in conjunction with the location determination processing system (sensing means). If the control means operative in the second mode is still on 213, the data flow at the focal plane of an image sensor is turned on. To prevent imaging of an exclusion zone while the sensor is moving on the way to the command coordinates, the data flow at the focal plane of the image sensor is not turned on until the image sensor is pointed at the proper coordinate location.

If the ground command imaging coordinates include an exclusion zone 206, the control means operative in the first mode causes the satellite imaging system's sensing means to roll the satellite to a non-imaging position, to point the mirror (if there is one) to a non-imaging position, and not turn on the data flow at the focal plane of the image sensor at either the preamplifiers or at the analog-to-digital converter 207. The satellite imaging system then awaits the next pointing command from the ground station. There are at least two and in most systems three actions taken to prevent viewing of the exclusion zone: rolling the satellite, turning the data flow off at the focal plane, and rotating the mirror if there is one. This redundancy greatly increases the systems reliability against component failure in orbit.

Locating the control means operative in the second mode (on/off control) of the satellite imaging system as to sensing any region of the earth at three points along the process 202, 211 and 213 further increases the reliability of the system against component failure in orbit. The control means operative in the second mode is activated by an encrypted signal transmitted from either a ground station or another orbiting satellite controlled by the United States government. The control means operative in the second mode only responds to an encrypted signal whose code is only known to the United States government. The control means operative in the second mode is designed so that once the imaging system is turned off it will remain off until turned back on. Alternatively, the control means operative in the second mode is designed so that once turned off it will stay off. The capability chosen will depend upon the particular sensor and the policy of the United States government.

It should be understood that the embodiment described herein is merely exemplary and that a person skilled in the art may make many variations and modifications to this embodiment utilizing functionally equivalent elements to those described herein. Any and all such variations or modifications as well as others which may become apparent to those skilled in the art, are intended to be included within the scope of the invention as defined by the appended claims.

What is claimed is:

1. In a space orbiting remote sensing system of the type having sensing means for sensing any portion of the earth when pointed at said portion, in combination therewith the improvement comprising:

storage means for storing data indicative of at least one exclusion zone defining a region of the earth not to be sensed by said sensing means; and control means operative in a first mode to recognize said at least one exclusion zone to prevent pointing of said sensing means at said exclusion zone, in response to a request to sense a portion of the earth which includes at least one said exclusion zone, and operative in a second mode independent of said first mode to prevent pointing of said sensing means at any portion of the earth.

2. The space orbiting remote sensing system of claim 1, wherein said space orbiting remote sensing system is a satellite imaging system including a plurality of satellites with image sensors providing a resolution in the less than to five meter range.

3. The space orbiting remote sensing system of claim 2, wherein said storage means includes logic circuitry defining said at least one exclusion zone coupled to said sensing means having location determination processing means and command and control means for pointing at least one of said plurality of satellites.

4. The space orbiting remote sensing system of claim 2, wherein said storage means includes a processor implemented system with read only memory storing said data indicative of at least one exclusion zone coupled to said sensing means having location determination processing means and command and control means for pointing at least one of said plurality of satellites.

5. The space orbiting remote sensing system of claim 2, wherein said storage means includes a processor implemented system with random access memory storing said data indicative of at least one exclusion zone coupled to said sensing means having location determination processing means and command and control means for pointing at least one of said plurality of satellites, said random access memory being stored with said data indicative of at least one exclusion zone by transmitted encrypted signals.

6. The space orbiting remote sensing system of claim 2, wherein said control means operative in said first mode influences said sensing means having location determination processing means and command and control means to roll at least one of said plurality of satellites to a non-imaging position when transmitted imaging coordinates include said at least one exclusion zone.

7. The space orbiting remote sensing system of claim 2, wherein said control means operative in said first mode influences said sensing means having location determination processing means and command and control means to rotate a pointing mirror on at least one of said plurality of satellites to a non-imaging position when transmitted imaging coordinates include said at least one exclusion zone.

8. The space orbiting remote sensing system of claim 2, wherein said control means operative in said first mode influences said sensing means having location determination processing means and command and control means to not turn on the data flow at the focal plane of one of said image sensors when transmitted imaging coordinates include said at least one exclusion zone.

9. The space orbiting remote sensing system of claim 2, wherein said control means operative in said second mode is responsive to a transmitted, encrypted signal.

10. The space orbiting remote sensing system of claim 9, wherein said control means operative in said second mode influences said sensing means to render said space orbiting remote sensing system into a non-imaging mode including at least one of rolling one of said plurality of satellites into a non-imaging position, rotating a mirror on at least one of said plurality of satellites into a non-imaging position, and not turning on the data flow at the focal plane of at least one of said image sensors.

11. In a method for controlling a space orbiting remote sensing system of the type having sensing means for sensing any portion of the earth when pointed at said portion, in combination therewith the improvement comprising the steps of:
   storing date indicative of at least one exclusion zone defining a region of the earth not to be sensed by said sensing means;
   controlling said sensing means to operate in first mode to recognize said at least one exclusion zone for preventing said sensing means from pointing at said at least one exclusion zone in response to a request to sense a portion of the earth which includes said at least one exclusion zone;
   controlling said sensing means to operate in a second mode independent of said first mode for preventing said sensing means from pointing at any portion of the earth; and
   providing control signals to said sensing means for operating said sensing means in at least one of said first mode and said second mode.

12. The method of claim 11, wherein said space orbiting remote sensing system is a satellite imaging system including a plurality of satellites with image sensors providing a resolution in the one to five meter range.

13. The method of claim 12, wherein said step of storing data includes defining said region of the earth with logic circuitry coupled to said sensing means having location determination processing means and command and control means for pointing at least one of said plurality of satellites.

14. The method of claim 12, wherein said step of storing data includes storing said data onto read only memory coupled to a processor coupled to said sensing means having location determination processing means and command and control means for pointing at least one of said plurality of satellites.

15. The method of claim 12, wherein said step of storing data includes storing said data onto random access memory coupled to a processor coupled to said sensing means having location determination processing means and command and control means for pointing at least one of said plurality of satellites, said random access memory being stored with said data by transmitted, encrypted signals.

16. The method of claim 12, wherein said step of controlling said sensing means to operate in a first mode further includes the step of rolling at least one of said plurality of satellites to a non imaging position when transmitted imaging coordinates include said at least one exclusion zone.

17. The method of claim 12, wherein said step of controlling said sensing means to operate in a first mode further includes the step of rotating a pointing mirror on at least one of said plurality of satellites to a non-imaging position when transmitted imaging coordinates include said at least one exclusion zone.

18. The method of claim 12, wherein said step of controlling said sensing means to operate in first mode further includes the step of not turning on the data flow at the focal plane of at least one of said imaging sensors when transmitted imaging coordinates include said at least one exclusion zone.

19. The method of claim 12, wherein said control signals are encrypted signals transmitted from at least one of a ground station and another orbiting satellite.

20. The method of claim 19, wherein said step of controlling said sensing means to operate in said second mode further includes at least one of the steps of rolling one of said plurality of satellites into a non-imaging position, rotating a mirror on at least on of said plurality of satellites into a non-imaging position, and not turning on the data flow at the focal plane of at least one of said imaging sensors.

21. In a method for controlling the sensing of any region of the earth with a satellite imaging system having a sensing means for pointing at least one of a plurality of satellites with image sensors at said any region for imaging, comprising the steps of:
   forming at least one exclusion zone defining a region of the earth;
   receiving imaging coordinates from a ground control station;
   determining if said imaging coordinates received include said at least one exclusion zone;
   pointing said at least one of a plurality of satellites towards said imaging coordinates for image sensing if said imaging coordinates do not include said at least one exclusion zone;
   controlling said at least one of a plurality of satellites as to said at least one exclusion zone to prevent pointing of said satellites for image sending if said imaging coordinates include said at least one exclusion zone; and,
   controlling said at least one of a plurality of satellites as to said any region of the earth with a transmitted, encrypted signal.

22. The method of claim 21, wherein said step of storing at least one exclusion zone includes defining said region of the earth with logic circuitry coupled to said sensing means.

23. The method of claim 21, wherein said step of forming at least one exclusion zone further includes storing data indicative of said region of the earth onto read only memory coupled to a processor coupled to said sensing means.

24. The method of claim 21, wherein said step of forming at least one exclusion zone further includes storing data indicative of said region of the earth onto random access memory coupled to a processor coupled to said sensing means, said random access memory being stored with said data indicative of said region of the earth by transmitted, encrypted signals.

25. The method of claim 21, wherein said step of controlling said at least one of a plurality of satellites as to said region of the earth includes at least one of the steps of rolling one of said plurality of satellites into a non-imaging position, rotating a mirror on at least one of said plurality of satellites into a non-imaging position, and not turning on the data flow at the focal plane of at least one of said imaging sensors.

26. The method of claim 21, wherein said step of controlling said at least one of a plurality of satellites as to said any region of the earth includes at least one of the steps of rolling one of said plurality of satellites into a non-imaging position, rotating a mirror on at least one of said plurality of satellites into a non-imaging position, and not turning on the data flow at the focal plane of at least one of said imaging sensors.

* * * * *